United States Patent
Lee (10) Patent No.: US 9,121,921 B2
(45) Date of Patent: Sep. 1, 2015

(54) LOCATION INFORMATION COLLECTION METHOD AND SYSTEM FOR DUAL SIM MOBILE TERMINALS

(75) Inventor: Jun Woo Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 362 days.

(21) Appl. No.: 13/288,461

(22) Filed: Nov. 3, 2011

(65) Prior Publication Data

US 2012/0149372 A1 Jun. 14, 2012

(30) Foreign Application Priority Data

Dec. 14, 2010 (KR) ........................ 10-2010-0127509

(51) Int. Cl.
- *H04W 24/00* (2009.01)
- *G01S 5/02* (2010.01)
- *H04W 4/00* (2009.01)
- *H04W 4/02* (2009.01)
- *H04W 64/00* (2009.01)
- *H04W 88/06* (2009.01)
- *H04W 88/08* (2009.01)

(52) U.S. Cl.
CPC ................ *G01S 5/02* (2013.01); *H04W 4/003* (2013.01); *H04W 4/02* (2013.01); *G01S 5/0263* (2013.01); *H04W 64/00* (2013.01); *H04W 88/06* (2013.01); *H04W 88/08* (2013.01)

(58) Field of Classification Search
CPC ..... H04W 88/06; H04W 64/00; G01S 5/0263
USPC ............ 455/456.1–456.6, 457, 552.1, 553.1, 455/432.1, 435.1
See application file for complete search history.

(56) References Cited

U.S. PATENT DOCUMENTS

| | | | |
|---|---|---|---|
| 5,764,730 A * | 6/1998 | Rabe et al. ..................... 455/403 |
| 6,362,783 B1 * | 3/2002 | Sugiura et al. ................ 342/457 |
| 7,974,627 B2 * | 7/2011 | Mia et al. ....................... 455/440 |
| 8,180,400 B2 * | 5/2012 | Shin et al. ..................... 455/558 |
| 2004/0176109 A1 * | 9/2004 | Niemenmaa ............... 455/456.5 |
| 2005/0130673 A1 * | 6/2005 | Annamalai ................ 455/456.2 |
| 2009/0258660 A1 * | 10/2009 | Bush et al. ................. 455/456.5 |
| 2010/0208649 A1 | 8/2010 | Chang et al. |

FOREIGN PATENT DOCUMENTS

GB 2 383 215 A 6/2003

* cited by examiner

*Primary Examiner* — Olumide T Ajibade Akonai
(74) *Attorney, Agent, or Firm* — Jefferson IP Law, LLP (57) ABSTRACT

A location information collection method and system for dual SIM mobile terminals are provided. The method includes sending, by a mobile terminal, a request for location information of the dual Subscriber Identity Module (SIM) terminal to at least one of multiple service centers providing communication services related respectively to SIM cards of the dual SIM terminal, collecting, by the at least one service center, information regarding multiple base stations in which identification information elements of the SIM cards are respectively last registered, and generating tentative location information of the dual SIM terminal based on the collected base station information, and sending, by the at least one service center, the base station information or the tentative location information to the mobile terminal.

21 Claims, 5 Drawing Sheets

LOCATION INFORMATION COLLECTION METHOD AND SYSTEM FOR DUAL SIM MOBILE TERMINALS

PRIORITY

This application claims the benefit under 35 U.S.C. §119(a) of a Korean patent application filed on Dec. 14, 2010 in the Korean Intellectual Property Office and assigned Serial No. 10-2010-0127509, the entire disclosure of which is hereby incorporated by reference.

BACKGROUND OF THE INVENTION

1. Field of the Invention

The present invention relates to a dual Subscriber Identity Module (SIM) mobile terminal. More particularly, the present invention relates to a method and a system for location information collection that can more accurately identify the location of a dual SIM mobile terminal.

2. Description of the Related Art

A Subscriber Identity Module (SIM) card is a subscriber identification module in the form of a smart card for a mobile device, and stores personal information for authentication, billing, and security services. Such a SIM card has been developed to enable a subscriber to freely receive mobile communication services using a desired phone number in any place regardless of mobile communication systems, such as Code Division Multiple Access (CDMA) or Global System for Mobile communications (GSM) systems. In the third generation Universal Mobile Telecommunications System (UMTS), the subscriber identity module is referred to as a Universal Subscribe Identity Module (USIM).

A SIM card is manufactured as a smart card and may be installed in a mobile terminal. A mobile terminal having an installed SIM card reads subscriber information stored in the SIM card to perform initialization (including authentication) when powered on. The mobile terminal operates only when the SIM card is authenticated.

Although most mobile terminals have a single SIM card, mobile terminals having two SIM cards have been introduced. Such a dual SIM mobile terminal having two SIM cards may switch between the two SIM cards according to a user selection. That is, the user of a dual SIM mobile terminal may utilize two phone numbers with a single terminal.

When a mobile terminal is lost, a search is made around a base station to which the lost mobile terminal connected last. However, as the base station may have a coverage area of 1 Km or more in radius, it may be difficult to find a lost mobile terminal.

In some cases, it is necessary to collect location information of a mobile terminal. However, as methods of the related art tend to collect only rough location information of dual SIM mobile terminals, usefulness of the collected information may be low.

Therefore, a need exists for a method and a system for location information collection that can more accurately track the location of a dual SIM mobile terminal.

SUMMARY OF THE INVENTION

Aspects of the present invention are to address at least the above-mentioned problems and/or disadvantages and to provide at least the advantages described below. Accordingly, an aspect of the present invention is to provide a method and a system for location information collection that can more accurately track the location of a dual Subscriber Identity Module (SIM) mobile terminal.

Another aspect of the present invention is to provide a method and a system for location information collection that can increase the usefulness of collected location information of a dual SIM mobile terminal.

Another aspect of the present invention is to provide a method and a system for location information collection that can accurately track the location of a dual SIM mobile terminal to efficiently find a lost dual SIM mobile terminal.

In accordance with an aspect of the present invention, a method for collecting location information of a dual SIM terminal is provided. The method includes sending, by a mobile terminal, a request for location information of the dual SIM terminal to at least one of multiple service centers providing communication services related respectively to SIM cards of the dual SIM terminal, collecting, by the at least one service center, information regarding multiple base stations in which identification information elements of the SIM cards are respectively last registered, and generating tentative location information of the dual SIM terminal based on the collected base station information, and sending, by the at least one service center, the base station information or the tentative location information to the mobile terminal.

In accordance with another aspect of the present invention, a system for collecting location information of dual SIM terminals is provided. The system includes a dual SIM terminal having multiple SIM cards, a plurality of base stations for managing camping on of the SIM cards and for providing communication services according to registration information of the SIM cards, at least one service center for collecting information regarding multiple base stations in which the SIM cards are respectively last registered, and a mobile terminal for receiving base station information from the service center, for generating tentative location information of the dual SIM terminal based on the received base station information, and for storing or outputting the generated tentative location information.

In accordance with another aspect of the present invention, a system for collecting location information of dual SIM terminals is provided. The system includes a dual SIM terminal having multiple SIM cards, a plurality of base stations for managing camping on of the SIM cards and for providing communication services according to registration information of the SIM cards, and at least one service center for generating tentative location information of the dual SIM terminal based on information regarding multiple base stations in which the SIM cards are last registered.

In a feature of the present invention, the method and system for location information collection can more accurately track the location of a dual SIM mobile terminal and increase the usefulness of collected location information. Hence, the method and system may contribute to efficient location of a lost dual SIM mobile terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Particular terms may be defined to describe the present invention in the best manner. Accordingly, the meaning of specific terms or words used in the specification and the claims should not be limited to the literal or commonly employed sense, but should be construed in accordance with the spirit of the invention. The description of the various embodiments of the present invention is to be construed as exemplary only and does not describe every possible instance of the invention. Therefore, it should be understood that various changes may be made and equivalents may be substituted for elements of the invention.

FIGS. 1 through 5, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

Figure 1:
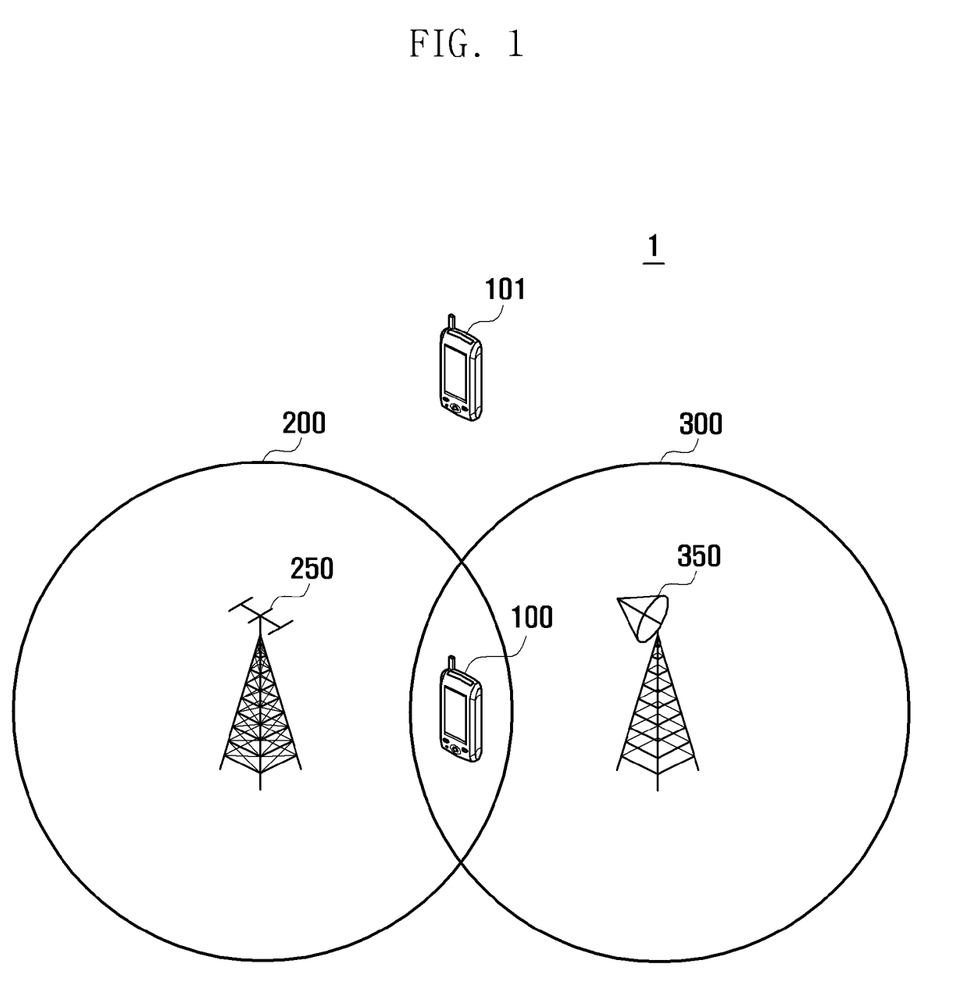
FIG. 1 illustrates a location information collection system for identifying a location of a dual Subscriber Identity Module (SIM) terminal according to an exemplary embodiment of the present invention.

FIG. 1 illustrates a location information collection system for identifying a location of a dual Subscriber Identity Module (SIM) terminal according to an exemplary embodiment of the present invention.

Referring to FIG. 1, a location information collection system 1 may include a first base station 250, a second base station 350, a dual SIM terminal 100, and a mobile terminal 101. The location information collection system 1 may further include base station controllers supporting the base stations, and a mobile switching center (or service center) connected with the base station controllers to support call processing.

The first base station 250 forms a first wireless communication coverage area 200 through power transmission and enables the dual SIM terminal 100 present in the first wireless communication coverage area 200 to connect to a first mobile communication network (not shown). The second base station 350 forms a second wireless communication coverage area 300 through power transmission and enables the dual SIM terminal 100 present in the second wireless communication coverage area 300 to connect to a second mobile communication network (not shown). The dual SIM terminal 100 may simultaneously connect to the first mobile communication network and the second mobile communication network through the first base station 250 and the second base station 350 to receive communication services according to a user request or device capabilities.

When the dual SIM terminal 100 supports dual standby operation, it periodically receives signals from the first base station 250 and the second base station 350 during an idle mode. The dual SIM terminal 100 may receive signals from the first base station 250 and the second base station 350 through similar or dissimilar frequency bands. The dual SIM terminal 100 may perform call mode operations through at least one of the first base station 250 and the second base station 350. During call mode operation, the dual SIM terminal 100 may send and receive signals to and from at least one of the first base station 250 and the second base station 350. While the dual SIM terminal 100 performs a call mode operation with the first base station 250, it may perform an idle mode operation with the second base station 350. The dual SIM terminal 100 may register information thereof in both the first base station 250 and the second base station 350 for communication channel setup.

To collect location information of the dual SIM terminal 100, the mobile terminal 101 (or a wired phone) may send a request for location information of the dual SIM terminal 100 to the service centers respectively managing the first base station 250 and the second base station 350. For example, the mobile terminal 101 may send a request for registration information of the dual SIM terminal 100 to a first service center managing the first base station 250 and to a second service center managing the second base station 350. In response, the first service center may send the location information of the first base station 250 in which the dual SIM terminal 100 last registered to the mobile terminal 101, and the second service center may send the location information of the second base station 350 in which the dual SIM terminal 100 last registered to the mobile terminal 101. Here, the first service center may be managed by the operator of the first mobile communication network, and the second service center may be managed by the operator of the second mobile communication network. In addition to location information, the first service center may provide map information and coverage area information of the first base station 250 to the mobile terminal 101, and the second service center may provide map information and coverage area information of the second base station 350 to the mobile terminal 101. Upon reception of the information, the mobile terminal 101 becomes aware that the dual SIM terminal 100 is located in a region between the first wireless communication coverage area 200 of the first base station 250 and the second wireless communication coverage area 300 of the second base station 350, and may obtain more detailed information on the location of the dual SIM terminal 100. Hereafter, a description is given of exemplary configurations of the dual SIM terminal 100 and the mobile terminal 101.

Figure 2:
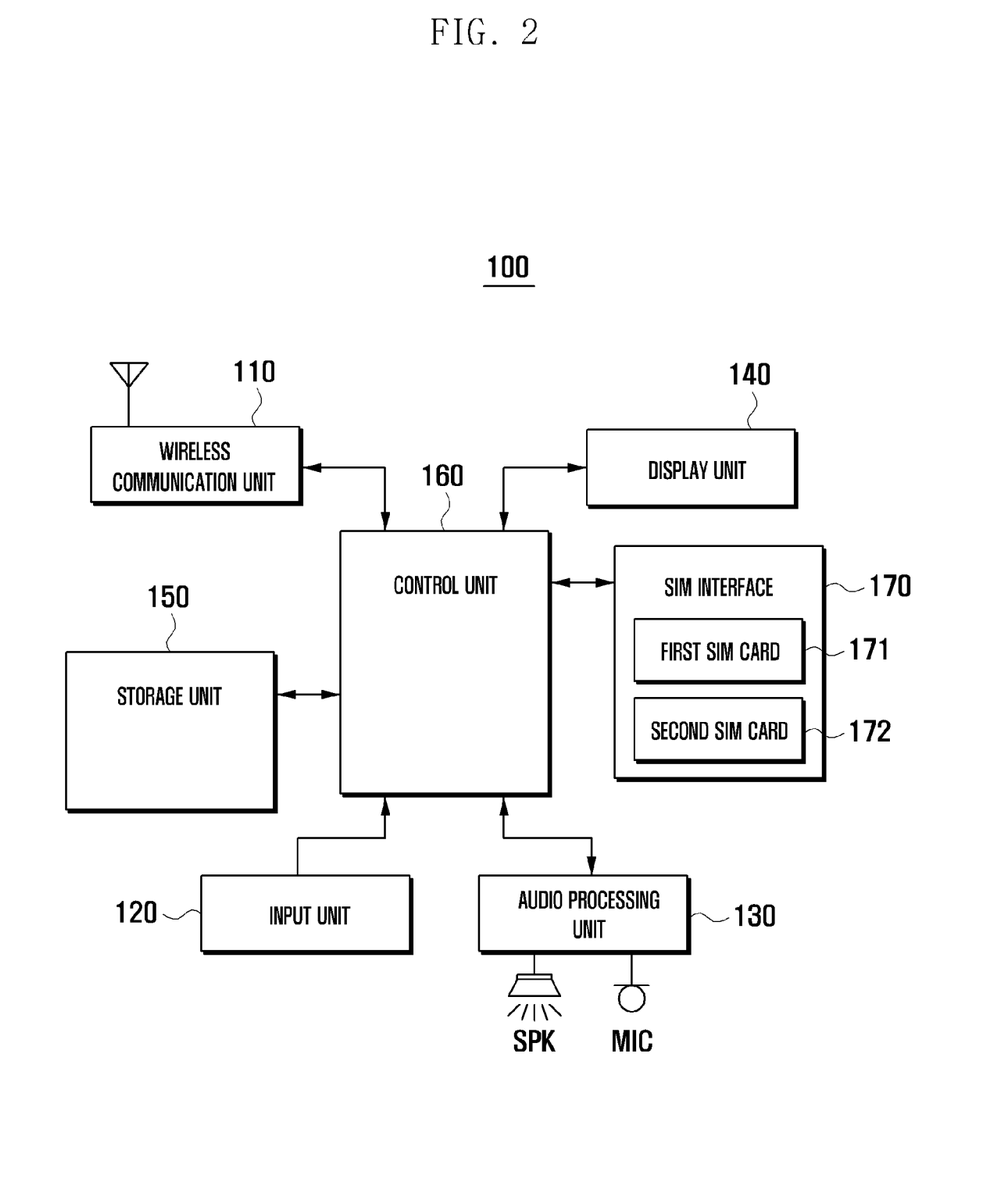
FIG. 2 is a block diagram of a dual SIM terminal according to an exemplary embodiment of the present invention.

FIG. 2 is a block diagram of a dual SIM terminal according to an exemplary embodiment of the present invention.

Referring to FIG. 2, a dual SIM terminal 100 includes a wireless communication unit 110, an input unit 120, an audio processing unit 130, a display unit 140, a storage unit 150, a SIM interface 170, and a control unit 160. A first SIM card 171 and a second SIM card 172 may be inserted in the SIM interface 170. In this exemplary implementation, two SIM cards are employed for ease of description. However, more than two SIM cards may be utilized in exemplary embodiments of the present invention, and the SIM interface 170 may be designed accordingly so as to accommodate more than two SIM cards.

In a state in which both the first SIM card 171 and the second SIM card 172 are inserted in the SIM interface 170, according to a user request or scheduling information, the dual SIM terminal 100 having the above configuration may camp on a first base station 250 associated with the first SIM card 171 and on a second base station 350 associated with the second SIM card 172 and register information thereof in the first base station 250 and the second base station 350. Hence, the dual SIM terminal 100 may register the first SIM card 171 in the first base station 250 and register the second SIM card 172 in the second base station 350 to thereby support communication through the base stations. More particularly, the information regarding the base stations in which the SIM cards of the dual SIM terminal 100 are registered may be used later to locate the dual SIM terminal 100. The wireless communication unit 110 establishes a communication channel for voice, video and data communication under the control of the control unit 160. That is, the wireless communication unit 110 establishes a communication channel for a voice call, a data call and a video call to a mobile communication system. To achieve this, the wireless communication unit 110 may include a radio frequency transmitter for upconverting the frequency of a signal to be transmitted and for amplifying the signal, and a radio frequency receiver for low-noise amplifying a received signal and for downconverting the frequency of the received signal. More particularly, the wireless communication unit 110 may send and receive signals to search for base stations to camp on utilizing information stored in the first SIM card 171 and the second SIM card 172 according to user selection or preset scheduling information. Here, the wireless communication unit 110 may send identification information of the first SIM card 171 and the second SIM card 172 to the base stations.

The input unit 120 may generate various input signals for operating the first SIM card 171 and the second SIM card 172 inserted in the SIM interface 170. The audio processing unit 130 includes a speaker (SPK) for outputting incoming and outgoing audio data during a call and for outputting audio data contained in a message or stored in the storage unit 150, and a microphone (MIC) for collecting an audio signal, such as a voice signal during a call. The audio processing unit 130 may output audio data stored in the storage unit 150 or received from the outside. The display unit 140 may output screens related to operation of the dual SIM terminal 100. The storage unit 150 may store various application programs and related data necessary for operation of the dual SIM terminal 100 and received data.

Figure 3:
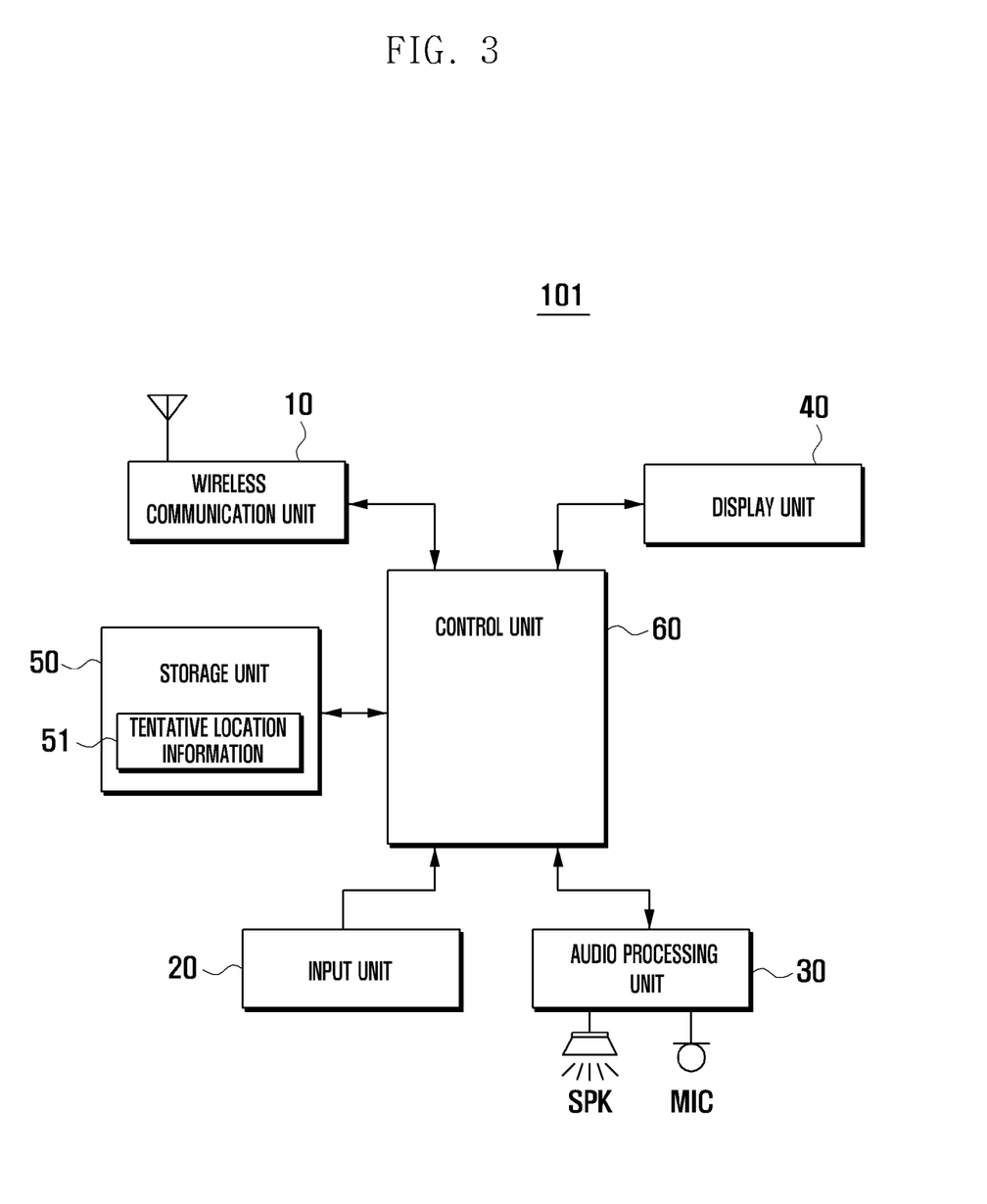
FIG. 3 is a block diagram of a mobile terminal according to an exemplary embodiment of the present invention.

FIG. 3 is a block diagram of a mobile terminal according to an exemplary embodiment of the present invention.

Referring to FIG. 3, a mobile terminal 101 may include a wireless communication unit 10, an input unit 20, an audio processing unit 30, a display unit 40, a storage unit 50, and a control unit 60. The mobile terminal 101 may be used to collect location information of the dual SIM terminal 100. In another exemplary implementation, instead of the mobile terminal 101, other types of devices having a display unit, such as a wired phone and a personal computer, may be used to collect location information of the dual SIM terminal 100. The mobile terminal 101 may be a dual SIM terminal or a single SIM terminal.

The mobile terminal 101 having the above configuration may establish a communication channel, through the wireless communication unit 10, with the first service center managing the first base station 250 or with the second service center managing the second base station 350. The mobile terminal 101 may send a request for collecting location information of the dual SIM terminal 100 to the first service center or the second service center. When tentative location information 51 of the dual SIM terminal 100 is received from the corresponding service center, the mobile terminal 101 may store and output the tentative location information 51. Thereafter, the mobile terminal 101 may accurately track the current location of the dual SIM terminal 100. For ease of description, the mobile terminal 101 is assumed to send a request for collecting location information of the dual SIM terminal 100 to the first service center.

The wireless communication unit 10 establishes a communication channel for voice, video and data communication under the control of the control unit 60. That is, the wireless communication unit 10 may establish a communication channel for a voice call, a data call and a video call to a mobile communication system. To achieve this, the wireless communication unit 10 may include a radio frequency transmitter for upconverting the frequency of a signal to be transmitted and for amplifying the signal, and a radio frequency receiver for low-noise amplifying a received signal and for downconverting the frequency of the received signal. More particularly, the wireless communication unit 10 may establish a communication channel to the first service center. When the first service center is accessible through the first base station 250, the wireless communication unit 10 may establish a communication channel to the first base station 250 and send and receive a signal for accessing the first service center according to user selection. When the first service center is accessible only through an Internet Protocol (IP) network, the wireless communication unit 10 may include an Internet access module. In this case, the mobile terminal 101 may first access the IP network through the wireless communication unit 10 and connect to the first service center connected to the IP network. Thereafter, the wireless communication unit 10 may receive tentative location information of the dual SIM terminal 100 from the first service center and forward the tentative location information to the control unit 60.

The input unit 20 includes a plurality of alphanumeric and function keys for inputting alphanumeric information and for setting various functions. The function keys may include direction, side, and shortcut keys associated with specific functions. More particularly, the input unit 20 may generate an input signal to connect to the first service center, an input signal to send a request for collecting location information of the dual SIM terminal 100, and an input signal to receive tentative location information of the dual SIM terminal 100 from the first service center according to user requests. The input unit 20 forwards the generated input signals to the control unit 60.

The audio processing unit 30 includes a speaker (SPK) for outputting incoming and outgoing audio data during a call and for outputting audio data contained in a message or stored in the storage unit 50, and a microphone (MIC) for collecting an audio signal, such as a voice signal during a call. The audio processing unit 30 may output an audible alert indicating successful connection to the first service center and output an audible alert indicating reception of tentative location information of the dual SIM terminal 100 from the first service center according to user settings. Output of such audible alerts may be skipped according to user settings.

The display unit 40 displays various menus of the mobile terminal 101, information input by the user, and information to be provided to the user. For example, the display unit 40 may output various screens related to usage of the mobile terminal 101, such as an idle screen, a menu screen, a message composition screen, a call handling screen, a gaming screen and a music playback screen. The display unit 40 may be realized using Liquid Crystal Display (LCD) devices or Organic Light Emitting Diodes (OLEDs). When the display unit 40 has a touchscreen capability, it may act as an input means. To support the touchscreen capability, the display unit 40 may include a display panel and a touch sensor placed on the display panel. More particularly, the display unit 40 may output various screens related to collection of location information of the dual SIM terminal 100. For example, the display unit 40 may output a screen for connecting to the first service center, a screen for authentication for collecting location information of the dual SIM terminal 100, a screen for requesting collection of location information of the dual SIM terminal 100, a screen for receiving tentative location information of the dual SIM terminal 100, and a screen for outputting the received tentative location information. After outputting the screen for authentication, the mobile terminal 101 may have to send user information and a password to the first service center for gaining authority to collect location information. To request collection of location information of the dual SIM terminal 100, the mobile terminal 101 may send identification information, such as a phone number associated with at least one of the SIM cards of the dual SIM terminal 100 to the first service center.

The storage unit 50 may store application programs realizing user functions of the mobile terminal 101, application programs for playing back various stored files, and key maps and menu maps for proper touchscreen operation if the touchscreen capability is realized. The key maps may correspond to various keyboard layouts including 3*4 and QWERTY layouts, and may include a control key map for controlling execution of an application program. The menu maps may include a menu map for controlling execution of an application program and a menu map for various menu items of the mobile terminal 101. The storage unit 50 may include a program region and a data region.

The program region may store an Operating System (OS) for booting and operating the mobile terminal 101, application programs for playback of music data, and application programs for viewing still images and moving images. More particularly, the program region may store a program for outputting location information (such as tentative location information) of the dual SIM terminal 100.

The location information output program is used to output the tentative location information 51, and may include a routine for outputting map information, a routine for marking the locations of the first base station 250 and the second base station 350 on the map, and a routine for drawing wireless communication coverage areas of the first base station 250 and the second base station 350 on the map. After execution of the location information output program, the user may determine that the tentative location of the dual SIM terminal 100 is a region 401 of FIG. 4 where the wireless communication coverage area of the first base station 250 overlaps that of the second base station 350.

The data region is an area that stores data generated in the course of using the mobile terminal 101, and may store various contents. When the display unit 40 has a touchscreen capability, the data region may store user input entered through the touchscreen. More particularly, the data region may store the tentative location information 51 received from the first service center.

The control unit 60 controls supply of power to the components of the mobile terminal 101 for initialization, and may control operations to collect current location information of the dual SIM terminal 100 after initialization. More specifically, to collect location information of the dual SIM terminal 100, when a user request for connecting to the first service center is input, the control unit 60 controls the wireless communication unit 10 to connect to the first service center.

Here, the first service center manages base stations (including the first base station 250) providing communication services related to at least one of the SIM cards of the dual SIM terminal 100. The first service center may support various communication services for many base stations and various dual SIM terminals based on preset SIM cards. The first service center may also support Internet access and provide various services to users through the Internet. In response to a request for location information collection from the mobile terminal 101, the first service center may collect tentative location information of the dual SIM terminal 100 and send the collected tentative location information to the mobile terminal 101. Here, to verify the proper authority to collect location information of the dual SIM terminal 100, the first service center may perform a verification procedure by comparing the identification information of the mobile terminal 101 with the preregistered information of the dual SIM terminal 100.

To generate tentative location information of the dual SIM terminal 100, the first service center may send a request for information on the second SIM card 172 to the second service center to which the second SIM card 172 is subscribed. In response to the request, the second service center may send identification and location information of the second base station 350 in which the second SIM card 172 is last registered to the first service center. Thereafter, the first service center may generate tentative location information by combining the information on the second base station 350 and the first base station 250 with map data. In this process, the first service center derives information on the first wireless communication coverage area 200 of the first base station 250 based on the transmit power of the first base station 250, and derives information on the second wireless communication coverage area 300 of the second base station 350 based on the transmit power of the second base station 350. The first service center may adjust the first wireless communication coverage area 200 and the second wireless communication coverage area 300 according to communication conditions around the locations of the corresponding base stations.

When the tentative location information is received from the first service center, the control unit 60 temporarily or semi-permanently stores the tentative location information in the storage unit 50. The control unit 60 may output the tentative location information 51 to the display unit 40 in response to a user request. The output screen of the tentative location information 51 is described with reference to FIG. 4.

As described above, in response to a user request, the mobile terminal 101 may send a request for location information of the dual SIM terminal 100 to one of the first service center associated with the first SIM card 171 and the second service center associated with the second SIM card 172, and receive corresponding tentative location information and output the received tentative location information. Hence, the mobile terminal 101 may more accurately track the current location of the dual SIM terminal 100.

Figure 4:
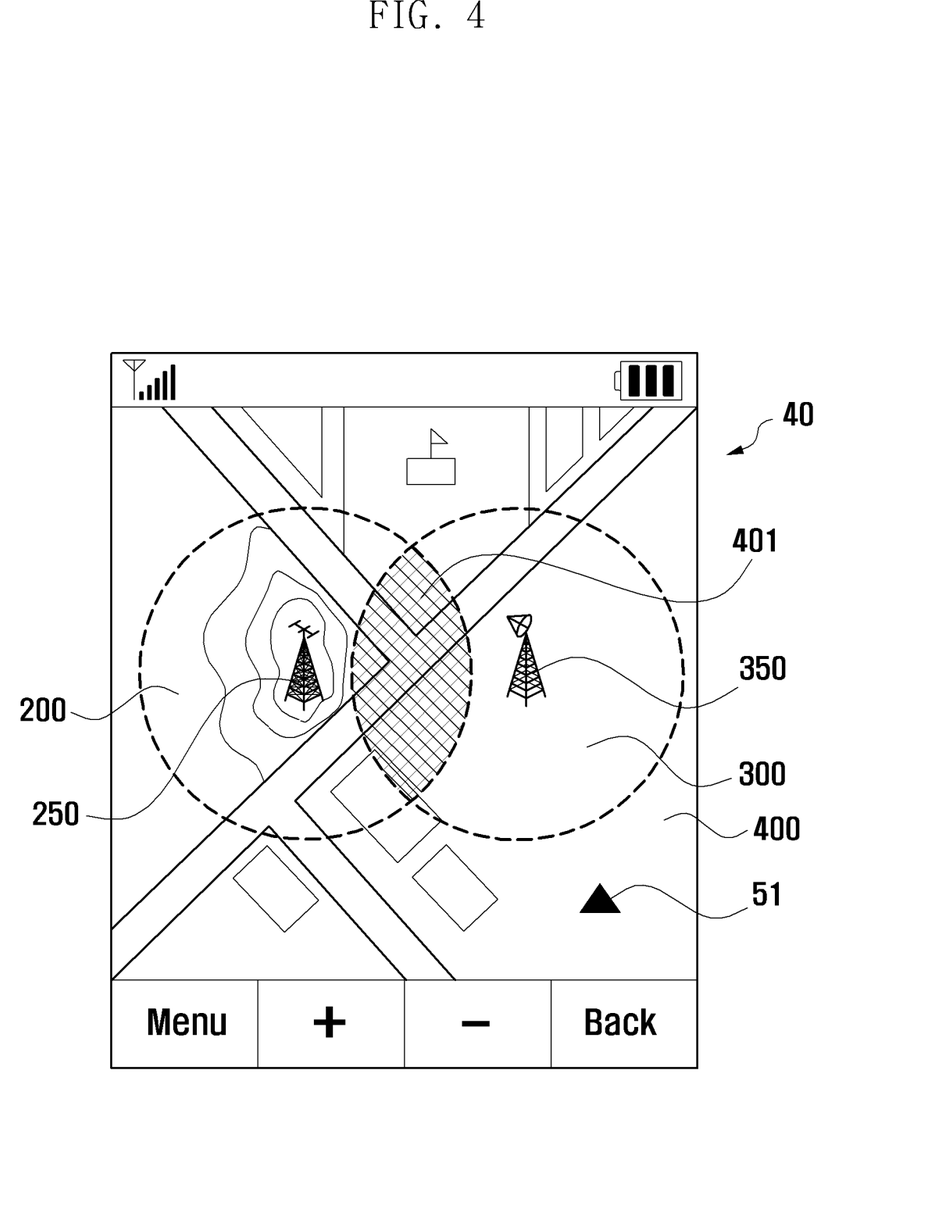
FIG. 4 illustrates tentative location information of a dual SIM terminal output on a display unit of a mobile terminal according to an exemplary embodiment of the present invention.

FIG. 4 illustrates tentative location information of a dual SIM terminal output on a display unit of a mobile terminal according to an exemplary embodiment of the present invention.

Referring to FIG. 4, the mobile terminal 101 may output the tentative location information 51 on the display unit 40 by drawing a first base station 250, a second base station 350, a first wireless communication coverage area 200 of the first base station 250, and a second wireless communication coverage area 300 of the second base station 350 on a map 400. On the map 400, the first base station 250 supporting camping-on and communication related to the first SIM card 171 is located at a left central portion, and the second base station 350 supporting camping-on and communication related to the second SIM card 172 is located at a right central portion.

On the map 400, the first base station 250 may be located at the central point of the first wireless communication coverage area 200, and the second base station 350 may be located at the central point of the second wireless communication coverage area 300. That is, in the output screen of the tentative location information 51, individual wireless communication coverage areas are arranged around the corresponding base stations. As shown in FIG. 4, the first wireless communication coverage area 200 and the second wireless communication coverage area 300 may overlap each other, resulting in an overlap region 401. The user of the mobile terminal 101 may be aware that the dual SIM terminal 100 is present in the overlap region 401 between the first wireless communication coverage area 200 and the second wireless communication coverage area 300.

Hereinabove, a description is given of exemplary entities and functions of the entities for collecting location information of the dual SIM terminal 100. Hereafter, a description is given of an exemplary method for collecting location information of the dual SIM terminal 100 in terms of signal flows between entities.

Figure 5:
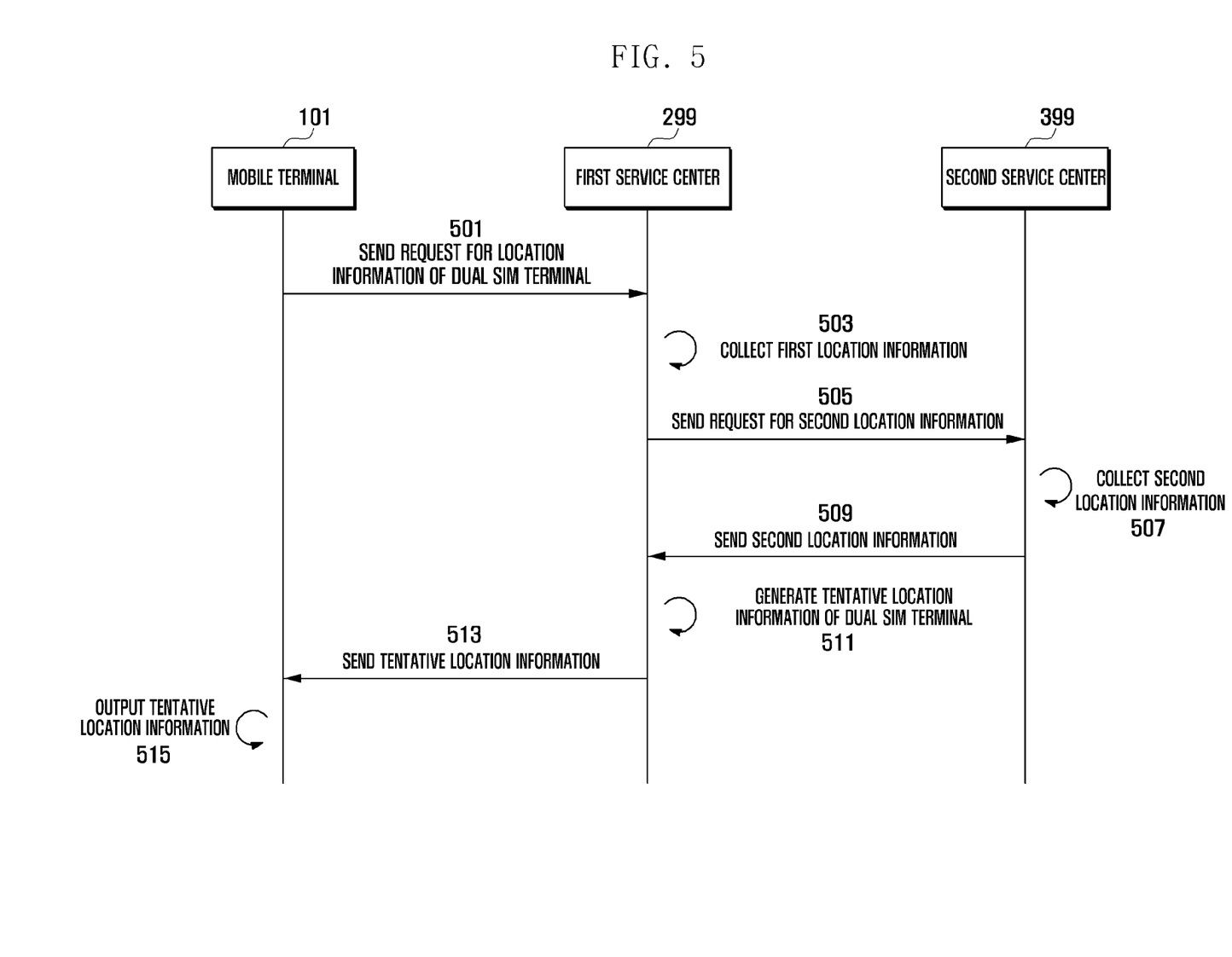
FIG. 5 is a sequence diagram illustrating a method of location information collection for dual SIM terminals according to an exemplary embodiment of the present invention.

FIG. 5 is a sequence diagram illustrating a method of location information collection for dual SIM terminals according to an exemplary embodiment of the present invention.

Referring to FIG. 5, in the location information collection method, the mobile terminal 101 sends a request for collecting location information of the dual SIM terminal 100 to a first service center 299 at step 501. Here, the mobile terminal 101 may have to establish a communication channel to the first service center 299 to send the request and connect to the first service center 299 for message or data exchange. The mobile terminal 101 may have to obtain authorization for collecting location information of the dual SIM terminal 100 by sending authentication information to the first service center 299.

Upon reception of the request for collecting location information of the dual SIM terminal 100, the first service center 299 verifies the authority of the mobile terminal 101 to collect location information and performs first-stage location information collection based on the first SIM card 171 of the dual SIM terminal 100 at step 503. Here, the first service center 299 may find a base station (for example, the first base station 250) in which the identification information of the first SIM card 171 is last registered, and obtains information on the location and wireless communication coverage area of the first base station 250.

The first service center 299 sends a request for second-stage location information collection based on the second SIM card 172 of the dual SIM terminal 100 to a second service center 399 at step 505. Here, the second service center 399 is a service center that supports registration and communication services for the second SIM card 172.

Upon reception of the request for second-stage location information collection, the second service center 399 finds a base station (for example, the second base station 350) in which the identification information of the second SIM card 172 is last registered, and obtains information on the location and wireless communication coverage area of the second base station 350 at step 507. Thereafter, the second service center 399 sends the collected second-stage location information to the first service center 299 at step 509.

The first service center 299 generates tentative location information of the dual SIM terminal 100 based on the first-stage location information and second-stage location information at step 511. Here, the first service center 299 may generate the tentative location information by collecting map data around the first base station 250 and the second base station 350, marking the positions of the first base station 250 and the second base station 350 on the map data, and drawing the first wireless communication coverage area 200 and the second wireless communication coverage area 300 on the map data. Thereafter, the first service center 299 sends the generated tentative location information to the mobile terminal 101 at step 513.

The mobile terminal 101 outputs the received tentative location information on the display unit 40 at step 515. Hence, the user may be aware of the approximate location of the dual SIM terminal 100.

As described above, in the method for location information collection of the present invention, it is determined that the dual SIM terminal 100 is present in an overlap region between wireless communication coverage areas of base stations associated respectively with the SIM cards installed in the dual SIM terminal 100. Hence, exemplary embodiments of the present invention make it possible to track the location of a mobile device in a more accurate way in comparison with methods of the related art.

In the above description, the first service center 299 generates the tentative location information and sends the same to the mobile terminal 101. However, exemplary embodiments of the present invention are not limited thereto. For example, in response to a request from the mobile terminal 101, the first service center 299 may send information on the first base station 250 associated with the first SIM card 171 (i.e., information regarding the location and transmit power or wireless coverage area of the first base station 250) to the mobile terminal 101. In response to a request from the mobile terminal 101, the second service center 399 may also send information on the second base station 350 associated with the second SIM card 172 (i.e., information regarding the location and transmit power or wireless coverage area of the second base station 350) to the mobile terminal 101 directly or via the first service center 299. Thereafter, the mobile terminal 101 may generate the tentative location information by applying the collected information on the first base station 250 and the second base station 350 to pre-stored map data, and output the tentative location information on the display unit 40. To achieve this, the mobile terminal 101 may store map information and an algorithm for deriving wireless communication coverage area from the base station information in the storage unit 50 in advance. When the base station information contains wireless coverage area information, the mobile terminal 101 may skip derivation of wireless communication coverage area and directly apply the received wireless coverage area information to map data.

In the above description, two service centers are employed to collect location information of a dual SIM terminal. However, exemplary embodiments of the present invention are not limited thereto. For example, the dual SIM terminal may have two SIM cards that are managed by the same service center and are related respectively with $2^{nd}$ Generation (2G) communication services and $3^{rd}$ Generation (3G) communication services. In this case, location information of the dual SIM terminal may be collected through a first service center.

If necessary, each of the dual SIM terminal 100 and the mobile terminal 101 may further include various components. That is, although not shown, each of the dual SIM terminal 100 and the mobile terminal 101 may further include at least one of a short-range communication module for short-range communication, a camera module for capturing still or moving images of a target object, a data communication interface based on wired and wireless communication, an Internet communication module for Internet access, and a digital broadcast receiving module for playing digital broadcasts. With the digital convergence trend, it should be apparent to those skilled in the art that each of the dual SIM terminal 100 and the mobile terminal 101 may further include a unit comparable to the above-described units, and one unit thereof may be removed or replaced with another unit.

The dual SIM terminal 100 may be any information and communication appliance or multimedia appliance, such as a mobile communication terminal based on communication protocols supporting various communication systems, a Portable Multimedia Player (PMP), a digital broadcast receiver, a Personal Digital Assistant (PDA), a music player (e.g., a Motion Pictures Expert Group (MPEG-1 or MPEG-2) Audio Layer-3 (MP3) player), a portable game console, a smart phone, a laptop computer, or a handheld computer.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A system for collecting location information of dual Subscriber Identity Module (SIM) terminals, the system comprising:
    a dual SIM terminal having multiple SIM cards;
    a plurality of base stations configured to manage camping on of the SIM cards and provide communication services according to registration information of the SIM cards;
    at least one service center configured to generate, based on location information of the plurality of base stations in which identification information of the SIM cards of the dual SIM terminal are last registered before tentative location information of the dual SIM terminal is requested by a mobile terminal, the tentative location information of the dual SIM terminal; and
    a mobile terminal configured to receive the tentative location information of the dual SIM terminal from the service center and output the received tentative location information.

2. The system of claim 1, wherein the mobile terminal comprises:
    a wireless communication unit configured to send a request for location information of the dual SIM terminal to the service center;
    a display unit configured to output the tentative location information received from the service center;
    a storage unit configured to store the tentative location information; and
    a control unit configured to control a process of sending the location information request, and receive and output the tentative location information.

3. The system of claim 2, wherein the at least one service center comprises:
    a first service center configured to support communication services related to a first SIM card of the dual SIM terminal; and
    a second service center configured to support communication services related to a second SIM card of the dual SIM terminal.

4. The system of claim 3, wherein the first service center collects, in response to the request for location information of the dual SIM terminal, first location information of a first base station in which identification information of the first SIM card is last registered, and sends a request for second location information of a second base station in which identification information of the second SIM card is last registered to the second service center.

5. The system of claim 4, wherein the second service center collects, in response to the request for the second location information from the first service center, the second location information of the second base station in which identification information of the second SIM card is last registered and sends the collected second location information to the first service center.

6. The system of claim 5, wherein the first service center, in addition to the first location information, provides map information and coverage area information of the first base station to the mobile terminal, and the second service center, in addition to the second location information, provides map information and coverage area information of the second base station to the mobile terminal.

7. The system of claim 6, wherein the first service center generates the tentative location information of the dual SIM terminal by applying information on the location and wireless coverage area of the first base station contained in the first location information to map data and by further applying information on the location and wireless coverage area of the second base station contained in the second location information to the map data.

8. The system of claim 7, wherein the mobile terminal outputs an overlap region between the wireless coverage area of the first base station and the wireless coverage area of the second base station on the map displayed on the display unit.

9. A system for collecting location information of dual Subscriber Identity Module (SIM) terminals, the system comprising:
a dual SIM terminal having multiple SIM cards;
a plurality of base stations configured to manage camping on of the SIM cards and provide communication services according to registration information of the SIM cards;
at least one service center configured to collect location information of multiple base stations in which identification information of the SIM cards of the dual SIM terminal are respectively last registered before tentative location information of the dual SIM terminal is requested by a mobile terminal; and
a mobile terminal configured to receive base station information from the service center, configured to generate tentative location information of the dual SIM terminal based on the received base station information, and store or output the generated tentative location information.

10. The system of claim 9, wherein the mobile terminal comprises:
a wireless communication unit configured to send a request for location information of the dual SIM terminal to the service center;
a storage unit configured to store the received base station information and map data; and
a control unit configured to generate tentative location information of the dual SIM terminal by applying the base station information to the map data, and control output of the tentative location information.

11. The system of claim 10, wherein the base station information comprises information regarding the location and wireless coverage area of a first base station in which identification information of a first SIM card of the dual SIM terminal is last registered, and information regarding the location and wireless coverage area of a second base station in which identification information of a second SIM card of the dual SIM terminal is last registered.

12. The system of claim 11, wherein the mobile terminal further comprises a display unit configured to output an overlap region between the wireless coverage area of the first base station and the wireless coverage area of the second base station on the map data.

13. A method for collecting location information of a dual Subscriber Identity Module (SIM) terminal, the method comprising:
sending, by a mobile terminal, a request for location information of the dual SIM terminal to at least one of multiple service centers providing communication services related respectively to SIM cards of the dual SIM terminal;
collecting, by the at least one service center, location information of multiple base stations in which identification information elements of the SIM cards of the dual SIM terminal are respectively last registered before tentative location information of the dual SIM terminal is requested by a mobile terminal, and generating the tentative location information of the dual SIM terminal based on the collected base station location information; and
sending, by the at least one service center, the base station information or the tentative location information to the mobile terminal.

14. The method of claim 13, wherein the base station information comprises information regarding the location and wireless coverage area of a first base station in which identification information of a first SIM card of the dual SIM terminal is last registered, and information regarding the location and wireless coverage area of a second base station in which identification information of a second SIM card of the dual SIM terminal is last registered.

15. The method of claim 14, further comprising:
generating, when the base station information is received, by the mobile terminal, tentative location information of the dual SIM terminal by applying the base station information to pre-stored map data; and
displaying, by the mobile terminal, an overlap region between the wireless coverage area of the first base station and the wireless coverage area of the second base station on a map according to the tentative location information.

16. The method of claim 15, further comprising storing, by the mobile terminal, the tentative location information in a storage unit.

17. The method of claim 13, wherein the collecting of information regarding multiple base stations comprises:
collecting, by a first service center receiving the request for location information of the dual SIM terminal, first location information of a first base station in which identification information of a first SIM card is last registered; and
sending, by the first service center, a request for second location information of a second base station in which identification information of a second SIM card is last registered to a second service center.

18. The method of claim 17, wherein the collecting of information regarding multiple base stations further comprises:
collecting, by the second service center, the second location information of the second base station in which identification information of the second SIM card is last registered; and
sending, by the second service center, the second location information to the first service center.

19. The method of claim 17, wherein the collecting of information regarding multiple base stations further comprises:
sending, by the first service center, the first location information to the mobile terminal; and
sending, by the second service center, the second location information to the mobile.

20. A mobile terminal comprising:
a control unit configured:
to transmit, to at least one service center, a request for tentative location information of the dual SIM terminal,
to receive, from the at least one service center, the tentative location information of the dual SIM terminal when the at least one service center generates, based on location information of the plurality of base stations in which identification information of the SIM cards of the dual SIM terminal are last registered before tentative location information of the dual SIM terminal is requested by a mobile terminal, the tentative location information of the dual SIM terminal, and
to display the received tentative location information of the dual SIM terminal.

21. A method for generating location information of a dual Subscriber Identity Module (SIM) terminal, the method comprising:
    transmitting, to at least one service center, a request for tentative location information of the dual SIM terminal,
    receiving, from the at least one service center, the tentative location information of the dual SIM terminal when the at least one service center generates, based on location information of the plurality of base stations in which identification information of the SIM cards of the dual SIM terminal are last registered before tentative location information of the dual SIM terminal is requested by a mobile terminal, the tentative location information of the dual SIM terminal, and
    displaying the received tentative location information of the dual SIM terminal.

* * * * *